MAXIMIZING THE POWER OUTPUT LEVEL OF KLYSTRON OSCILLATORS AND THE LIKE

Filed June 11, 1956

INVENTOR
DOUGLAS M. SHARP
BY Percy P. Lantzy
ATTORNEY

United States Patent Office 2,924,785
Patented Feb. 9, 1960

2,924,785

MAXIMIZING THE POWER OUTPUT LEVEL OF KLYSTRON OSCILLATORS AND THE LIKE

Douglas M. Sharp, Allendale, N.J., assignor to International Telephone and Telegraph Corporation, Nutley, N.J., a corporation of Maryland Application June 11, 1956, Serial No. 590,536
2 Claims. (Cl. 331—84)

This invention relates to radio power generator systems and particularly to systems employing electron tube oscillators of the reflex electron kind, of which the well known klystron is typical.

A principal object of the invention is to provide a novel system for automatically maintaining the output of a klystron oscillator at its optimum over a wide frequency range of operation of the system.

Another object is to provide a radio power generator employing an electron tube oscillator of the reflex electron or klystron kind, arranged to be swept through a predetermined frequency range and with a novel control arrangement whereby the power output can be automatically maintained at its optimum or peak value.

A feature of the invention is the provision of a wide band sweep frequency generator for very high frequencies, for example in the kilomegacycle range, which has its output automatically and electronically maximized at any frequency at which the system is operating.

Another feature relates to a wide bank sweep frequency generator of the generic klystron kind, wherein the oscillator frequency is varied over a predetermined band and optimum power output is maintained by electronically automatically controlling the voltage on the electron repeller electrode without the necessity of employing a mechanically moving potentiometer or the like to track the frequency of the output with the repeller voltage.

A further feature relates to a system employing a reflex electron oscillator, for example a klystron, wherein the generated power is controlled by the potential on a repeller electrode, in conjunction with a tunable frequency determining cavity, and wherein the phase of the modulated output corresponding to the application of a low amplitude square wave modulating signal on the repeller electrode is used for automatically maintaining the output at its optimum or peak value over the entire operating frequency band of the system.

A further feature relates to a novel phase discriminating arrangement for use with a klystron oscillator to produce a control signal whenever the oscillator is not operating at its maximum power output, even though it is being subjected to a wide band frequency change in output.

A still further feature relates to the novel organization, arrangement and relative interconnection of parts which by their conjoint action provide an improved sweep frequency generator of the klystron kind.

Other features and advantages will appear from the ensuing descriptions and the appended claims.

Figures 1, 2, 3:
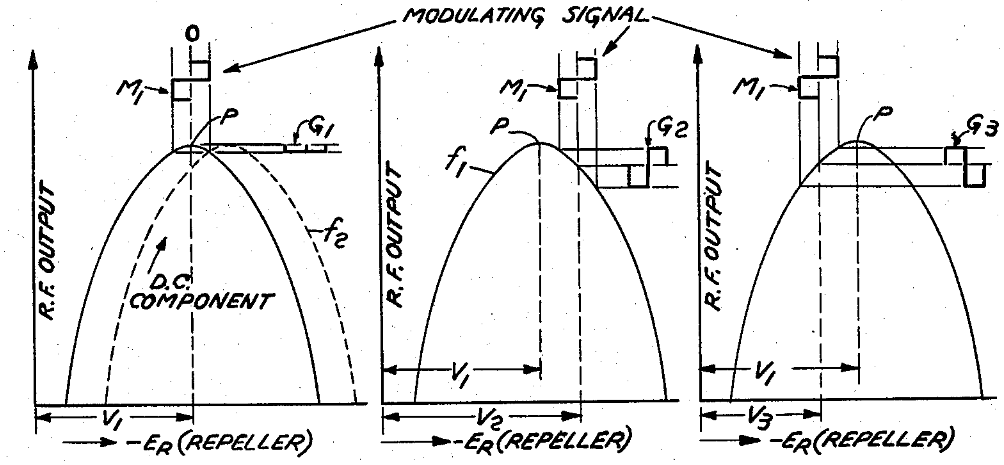
Figs. 1, 2 and 3 are composite graphs explanatory of the invention.

As is well known in connection with klystron tubes, as the negative voltage on the repeller electrode is increased from zero value there is an interval in which no power output is produced. Then at some particular negative voltage, power output is obtained and this power increases in magnitude with increasing repeller negative voltage until a maximum power lever is reached. Further increase of the negative repeller voltage beyond that which produces maximum output, causes a decrease of the output. This relation between repeller voltage and radio frequency power output is shown in Fig. 1 of the drawing for a given mode of operation at a cavity resonator frequency $f1$. If the cavity resonator frequency is increased and the repeller voltage tracked therewith, similar graphs or modes are obtained, one of which is represented by the dotted curve $f2$. The present invention utilizes a phase comparison arrangement for deriving the repeller control voltage which enables the system to operate at its peak power output regardless of cavity frequency and avoids the use of a mechanically operated potentiometer or the like for tracking the repeller voltage with the frequency change.

The principle upon which the repeller control signal is obtained can be understood by reference to Figs. 1, 2 and 3. In these figures a typical radio frequency output (power) versus repeller voltage klystron plot has been reproduced with three different repeller voltage conditions. These curves are at a particular cavity resonator frequency $f1$. In each case an identical low-amplitude square-wave modulation M1 has been added to the D.C. repeller voltage. In Fig. 1, the repeller voltage V1 causes the radio frequency power output of klystron to be at or near its optimum or peak value P. With this repeller voltage, the modulating signal M1 will result in a slight modulation of the radio frequency power output as indicated by the projected curve G1. For clarity the modulating signal has been drawn as a larger amplitude than necessary. Actually the modulating signal M1 is kept as small as possible, resulting in a very low percentage of both amplitude and frequency modulation of the radio frequency power and for all practical purposes is not of a troublesome nature.

Now, if the repeller voltage is of a higher negative magnitude than V1, as represented by voltage V2 in Fig. 2, and if the same amplitude of modulation wave M1 is applied to the repeller, then the radio frequency output will have a square wave characteristic G2, the phase of which is determined by the fact that the klystron is operating on the trailing edge or side of the characteristic curve $f1$. On the other hand, if the direct current negative potential applied to the repeller electrode of the klystron is less than V1, as indicated by the voltage V3 in Fig. 3, and if the same amplitude and wave shape modulating signal M1 is applied to the repeller electrode, the radio frequency output will then be represented by the projected curve G3. Under this latter condition, the phase of the graph G3 is exactly 180° out of phase with the graph G2. It is this 180° phase difference that provides a means of sensing the position of the direct current repeller component voltage with respect to the middle of the mode. It is this phase relationship that enables the circuit of this invention to correct the repeller voltage and thereby provide automatically optimum power output from the klystron oscillator.

Figure 4:
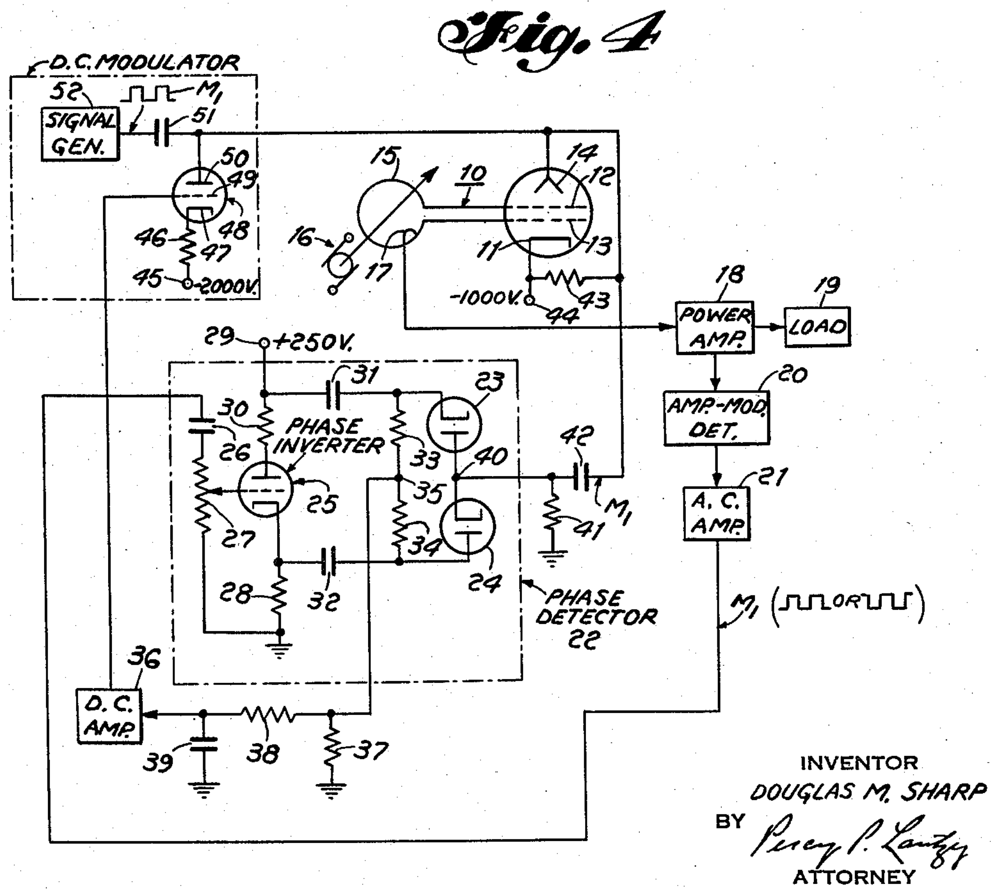
Fig. 4 is a schematic block diagram of a system according to the invention.

Referring to Fig. 4, there is shown in block diagrammatic form a system embodying the invention. In Fig. 4 the numeral 10 represents any well known klystron tube comprising, for example, the electron emitting cathode 11, the buncher electrodes 12, 13, and the electron repeller electrode 14. The electrodes 12, 13 are connected to the usual resonant cavity 15 whose resonant frequency can be mechanically changed in any well known manner, for example by a motor 16 which operates a cavity tuning element so as to vary the frequency of the oscillator 10 over the desired sweep frequency range. A suitable radio frequency output pickup probe 17 can be provided in the cavity 15. The radio frequency output from the klystron 10 is applied to any well known form of power divider 18 whereby the major portion of the power output can be supplied to a suitable load or other utilization device 19 while a small percentage of the power output can be supplied to an amplitude modulation detector 20 of any well known kind. The demodulated component in the output of detector 20 is then amplified in any well known alternating current amplifier 21, the output of which is applied to any well known phase detecting device or network 22.

Preferably, although not necessarily, the detector 22 may be of the type schematically illustrated in Fig. 4, comprising, for example, a pair of diode detectors or rectifiers 23, 24 and a phase inverter tube 25. The output of the amplifier 21 is connected through condenser 26 and then through an adjustable potentiometer 27 to ground. The arm of potentiometer 27 is connected to the control grid of the phase inverter tube 25 whose cathode is connected to ground through the bias resistor 28. The plate or anode of tube 25 is connected to a suitable positive direct current potential tap 29, for example of 250 volts, and through a suitable resistor 30. The plate and cathode of tube 25 are connected through respective equal condensers 31, 32 across the series connected equal resistors 33, 34, the junction point 35 of which is connected to the input of a direct current amplifier 36 through a suitable filter network consisting of the resistors 37, 38 and condenser 39. The opposite ends of the resistors 33, 34 can be connected, respectively, to the cathode of rectifier 23 and the anode of rectifier 24. The anode of rectifier 23 can be connected to the cathode of rectifier 24 and the junction point 40 therebetween is returned to ground through a suitable resistor 41.

The cathode 11 is connected to a suitable negative direct current potential tap 44, for example of —1000 volts. The negative potential of the repeller 14 with respect to the cathode 11 is derived from a suitable negative potential tap 45, for example of —2000 volts, which is connected through a resistor 46 to the cathode 47 of a direct current modulator tube 48. The grid 49 of this tube is connected to the output of the direct current amplifier 36 and the plate 50 is connected to the repeller 14. The negative potential of repeller 14 with respect to the cathode 11 is, therefore, determined by the normal conductivity of the tube 48. The conductivity of this tube is, of course, controlled by the direct current voltage applied to the grid 49 from the direct current amplifier 36. It will be understood that the amplifier 36 is chosen with sufficient gain to satisfy the required range of negative direct current voltage variation to be applied to the repeller 14. The repeller 14 is also connected through a suitable condenser 51 to a source 52 which generates the above-mentioned low amplitude modulating square wave M1. This square wave M1 is also connected through the condenser 42 to the junction point 40 of the phase detector, thus furnishing the required phase sampling or reference base for phase detector 22.

The output of the phase detector 22 which is applied to the input of direct current amplifier 36 is thus a direct current signal which reverses in polarity in accordance with the phase of the demodulated signals G2 and G3 from the detector 20. It will be seen, therefore that the fixed square wave modulating signal M1 is added to the direct current voltage from the amplifier 36 and the resultant voltage is applied to the repeller 14.

In using the system of Fig. 4 and assuming that the cavity 15 is tuned to the frequency *f*1, the parameters are chosen so that the voltage V1 from the amplifier 36 corresponds to the peak power output P of the klystron. Under such condition the output of the phase detector 22 may be zero or some other fixed base reference output, so that the negative voltage applied to repeller 14 is at the optimum value V1. If, for any reason, the klystron power output should depart from the optimum value, a correction in repeller voltage is necessary to restore the repeller to the optimum value potential. This condition is made evident by an increase in amplitude of the signal applied to the phase detector 22 from the amplifier 21, and with a distinct phase relationship depending upon which side of the klystron mode characteristic the system is operating. If the system is operating on the trailing edge of the mode, as represented schematically in Fig. 2, the phase of the signal from amplifier 21 will be represented by the graph G2 in Fig. 2. On the other hand, if the system is operating on the leading side of the mode, the output of amplifier 21 will be of 180° opposite phase, as represented by the graph G3 in Fig. 3. The connections are such that with the phase G2 the resultant negative potential at repeller 14 is reduced in magnitude so as to restore the repeller voltage to the magnitude V1 corresponding to peak output P. On the other hand, when the signal from the phase detector 22 has the phase represented by the graph G3, the resultant negative potential applied to repeller 14 is increased in magnitude so as again to insure that the repeller voltage becomes V1 corresponding to peak power output.

While the above described condition has been assumed for one cavity resonator frequency corresponding to frequency *f*1, it will be understood that if the system is to be operated at a different cavity resonator frequency, the cavity 15 is tuned to the required frequency and the potential on repeller 14 is caused to track automatically the change in cavity frequency by the circuit of this invention to again be at the optimum value and hence optimum power output will result.

I have found that if the amplifiers 21 and 36 are made of sufficiently high gain, it is possible to operate the system so that its output remains substantially at its optimum or peak value over the entire cavity resonator frequency sweep of the system.

While I have described above the principles of my invention in connection with particular apparatus, it is to be clearly understood that this description is made only by way of example and not as a limitation to the scope of my invention as set forth in the objects thereof and in the accompanying claims.

What is claimed is:

1. A microwave sweep frequency generator employing a klystron having at least a cathode, a repeller electrode, an electron bunching electrode system and a resonant tunable cavity coupled to said bunching system and adjustable to determine the frequency of the output of the oscillator, a radio frequency pickup element coupled to said cavity, a radio frequency power divider having its input connected to said pickup element, a source of low frequency low amplitude square waves, means to modulate the direct current potential applied to said repeller electrode under control of said waves, a direct current amplifier whose output is connected to said modulator and whose input is connected to a phase detector, means to apply to said phase detector a base reference phase signal of the same frequency and polarity as said square waves, and means also to apply to said phase detector the detected modulations in the output of the oscillator to produce a resultant direct current potential to be amplified by said direct current amplifier, which potential maintains said oscillator output at or near optimum power.

2. A microwave sweep frequency generator employing a radio frequency oscillator of the klystron kind including at least a cathode and a repeller electrode, means to apply a normal negative direct current potential to the repeller electrode to produce optimum power output, said means including a direct current potential source and a direct current modulator, a source of low amplitude fixed frequency modulation signal voltage, means to apply the said signal voltage to said repeller electrode to produce a corresponding signal modulation in the power output, amplitude modulation means to detect said signal modulation in said output, a phase detector, means connecting said source of signal modulation to said phase detector to employ the output thereof as a base reference phase signal therefor, means also to apply said detected modulations to said phase detector to produce from the phase detector a direct current output voltage corresponding to the difference in phase between said reference base signal and said detected modulation, a direct current amplifier for said direct current output signal, and means to apply the amplified direct current from said direct current amplifier to said modulator and thereby to maintain the negative voltage on said repeller to maintain the radio frequency output of said oscillator at its optimum value.

References Cited in the file of this patent

UNITED STATES PATENTS

| | | |
|---|---|---|
| 2,493,011 | Miller | Jan. 3, 1950 |
| 2,527,730 | Hoglund | Oct. 31, 1950 |
| 2,692,947 | Spencer | Oct. 26, 1954 |
| 2,754,420 | Ratcliffe | July 10, 1956 |